United States Patent Office 3,555,727
Patented Jan. 19, 1971

3,555,727
FROST PREVENTATIVE FOR CROPS
Fred M. Jaquith, Caldwell, Idaho, assignor of twenty-five percent to Clarence Virgill West, Boise, Idaho
No Drawing. Filed Jan. 30, 1970, Ser. No. 7,238
Int. Cl. A01g 13/00
U.S. Cl. 47—2
15 Claims

ABSTRACT OF THE DISCLOSURE

Molasses, preferably beet sugar molasses, is employed as a frost protectant for plants, preferably fruit trees. The sugar beet molasses application also provides food for foliage growth. Preferably there is included a formulation for increasing the pollination of fruit.

---

The present invention relates to the protection of plant life from frost damage.

It is the primary object of the present invention to reduce frost damage of plants, particularly fruit trees.

Another object is to provide a food source for foliar growth while at the same time protecting plants, particularly fruit trees, from frost damage.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by applying to plants, particularly fruit trees, susceptible to frost damage molasses. The molasses is normally applied to the plants at any time from the green bud stage to the fruitlet stage.

The present treatment is not to be confused with the treatment in Hopf Pat. 2,610,117 wherein molasses is employed in a formulation which is burned in a greenhouse. In the Hopf procedure the molasses is simply a source of fuel to provide heat and volatilize the plant hormone and Vitamin K. In the present invention the molasses is applied directly as the frost protectant to the living trees, i.e. to the buds, foliage, flowers, fruitlets and/or fruit.

The preferred form of molasses is beet sugar molasses (most preferably animal grade beet sugar molasses). Not only does the beet sugar molasses act as a frost protectant but it also acts as a food for foliage growth. Beet sugar molasses contains some 30 constitutents. The beet sugar molasses is alkaline in pH (usually about 7.5–8.6) and typically contains 16.5% water, 51% sucrose, 1% raffinose, 1% invert sugar, 3.5% glutamic acid, 5.5% other protein acids, 10% other organic compounds, 0.1% silica, 3.9% potassium, 1.3% sodium, 0.02% iron oxide, 0.07% aluminum oxide, 0.26% calcium, 0.16% magnesium, 0.55% sulfate, 0.06% phosphate, 1.6% chloride, 3.5% carbonate.

Less preferably there can be used other forms of molasses such as sugar cane molasses and sorghum molasses. Sugar cane molasses differs considerably from beet sugar molasses in composition. Thus the cane molasses is slightly acid, usually having a pH of 5.5–6.5 and typically has the composition 20% water, 32% sucrose, 14% d-glucose, 16% fructose, 0.3% albuminoids, 0.3% amides (as asparagine), 1.7% amino acids (as aspartic acid), 0.15% nitric acid, 0.02% ammonia, 0.3% xanthine bases, 0.23% other nitrogenous substances, 2% soluble germs (xylan, araban pectin, etc.), 2% free and 3% combined organic acids (primarily aconitic acid but also including melassic acid, glutimic acid and saccharinic acid), 0.5% silica, 3.5% potash, 1.5% lime, 0.1% magnesia, 0.2% phosphoric acid, 1.6% sulfuric acid, 0.4% chlorine, 0.2% soda, iron and miscellaneous. (Kirk-Othmer first edition, vol. 9, pages 167–168 shows the typical beet sugar and cane sugar molasses analyses).

The molasses is normally diluted with water to give a formulation having 0.1 to 8 gallons of molasses in 100 gallons of product, usually 0.25 to 4 gallons of molasses in 100 gallons of product and most preferably about 0.5 gallon of molasses in 100 gallons of product.

There is also desirably included in the final product salt in an amount of 0.06 to 0.5 pound per gallon of molasses. The salt can be used in lesser amounts or even omitted.

For best results there is included a composition for assisting the pollination of fruit. Such a composition for example is Pollenaid 300 (made by Crop King) which contains 0.36% Manganese (present as mono sodium manganous hydroxyethyl ethylene diamine triacetate), 0.72% iron (present as mono sodium ferrous hydroxyethyl ethylene diamine triacetate), 0.88% nitrogen (present as carbamide, mono sodium manganous hydroxyethyl ethylene diamine triacetate, and mono sodium ferrous hydroxyethyl ethylene diamine triacetate) and 98.04% inert ingredients. The inert ingredients consist essentially of water.

When the Pollenaid 300 or similar pollination assistant is employed, it is usually used in an amount of 0.06 gallon to 1 gallon, preferably 0.25 gallon, per gallon of molasses. The pollination aid likewise can be used in larger or smaller amounts or can be omitted. Pollenaid 300 is abbreviated hereinafter as P-300.

Additionally there can be used convention nonionic, anionic and cationic emulsifier formulations. Thus, there can be used K262 (made by Crop King) which is believed to be a mixture of 20% sodium petroleum sulfonates and an alkylaryl polyether alcohol and 80% petroleum hydrocarbon solvent. Other conventional emulsifiers can be used such as octylphenolethylene oxide adduct with 10 ethylene oxide units, nonylphenol-ethylene oxide condensate, sorbitan monooleate ethylene oxide condensate, C-dodecyl betaine, triethanolamine lauryl sulfate, sorbitan monolaurate, tall oil-ethylene oxide condensate, saponin, sodium decylbenzene sulfonate, sodium dodecane sulfonate, sodium lauryl sulfate, etc.

The emulsion formulations can contain conventional hydrocarbon solvents, e.g. mineral oil, kereosene, etc.

Multifilm X-77, hereinafter referred to as X-77 (made by Colloidal Products Corp.) is a mixture of alkylaryl polyethoxy ethanol and free fatty acids and is employed herein as an emulsifier and wetting agent.

Tronic (made by Colloidal Products Corp.) is believed to be a mixture of nonionic, anionic, and cationic agents i.e. alkylaryl polyoxyethylene glycols, mixed petroleum distillates, alkyl sulfate and alkyl amine acetate. Trionic represents that class of materials used in agricultural formulations familiarly known as a spreader-sticker agent.

X-77 is an emulsifier and was used in an amount of 0.25 part per part P-300.

The emulsifier formulation can be used, for example, in an amount of 0.1 to 0.25 gallon per gallon of molasses, although this can be widely varied or the emulsifier formulation omitted.

The molasses containing frost control agents of the present invention can be applied to fruit trees such as peach, apple, plum, cherry, pear, apricot, citrus fruit trees, e.g. orange, lemon, lime and grapefruit, cranberry and avocado plants, tomato and potato plants, etc.

In Example 1, the 87 formulations were prepared by adding enough water to the base formulation to make up to 4–4.5 gallons of water and then diluting the solution thus prepared with sufficient water to make 100 gallons before applying the formulation as a spray. Those formulations which contained 8 gallons of molasses in the base formulation were simply diluted directly to 100 gallons with water. The checks indicate simply untreated trees. A number of the formulations were simply repeats of earlier formulations as will be evident from Table 1 which lists the 87 base formulations.

TABLE 1

| Formula: | Contents |
|---|---|
| 1 | Check. |
| 2 | 8 gallons molasses, 0.5 lb. salt. |
| 3 | 2 gallons molasses, 0.5 lb. salt. |
| 4 | 4 gals. molasses, 0.5 lb. salt. |
| 4 | 4 gallons molasses, 0.5 lb. salt. |
| 5 | 4 gallons molasses, 0.5 lb. salt, 0.5 gal. P–300, and X77. |
| 6 | 1 gallon molasses, 0.5 lb. salt, 0.5 gallon P–300, and X77. |
| 7 | 1 gallon molasses, 0.5 lb. salt, 0.5 gallon P–300, and X77. |
| 8 | 2 gallons molasses, 0.5 lb. salt, 0.5 gallon P–300, and X77. |
| 9 | 8 gallons molasses, 0.5 gallon P–300 and X77. |
| 10 | 1 gallon molasses, 0.5 lb. salt, 0.5 gallon P–300, and X77. |
| 11 | 0.5 gallon molasses, 0.5 gallon P–300 and X77. |
| 12 | 2 gallon molasses, 0.5 gallon P–300 and X77. |
| 13 | 4 gallons molasses, 0.5 gallon P–300 and X77. |
| 14 | 1 gallon molasses, 0.5 lb. salt. |
| 15 | Check. |
| 16 | 4 gallons molasses, 0.5 lb. salt. |
| 17 | 2 gallons molasses, 0.5 lb. salt, 0.5 gallon P–300, and X77. |
| 18 | 1 gallon molasses, 0.5 lb. salt. |
| 19 | 0.5 gallon P–300 and X77. |
| 20 | 1 gallon molasses, 0.5 lb. salt, 0.5 gallon P–300, and X77. |
| 21 | 2 gallons molasses, 0.5 lb. salt, 0.5 gallon P–300. |
| 22 | 4 gallons molasses, 0.5 gallon P–300 and X77. |
| 23 | 8 gallons molasses, 0.5 lb. salt. |
| 24 | 4 gallons molasses, 0.5 lb. salt, 0.5 gallon P–300. |
| 25 | 2 gallons molasses, 0.5 lb. salt. |
| 26 | 8 gallons molasses, 0.5 gallon P–300 and X77. |
| 27 | 2 gallons molasses, 0.5 gal. P–300 and X77. |
| 28 | Check. |
| 29 | 2 gallons molasses, 0.5 lb. salt. |
| 30 | 2 gallons molasses, 0.5 lb. salt, 0.5 gallon P–300, and X77. |
| 31 | 1 gallon molasses, 0.5 lb. salt, 0.5 gallon P–300, and X77. |
| 32 | 0.5 gallon P–300, and X77. |
| 33 | 1 gallon molasses, 0.5 lb. salt. |
| 34 | 4 gallons molasses, 0.5 lb. salt. |
| 35 | 4 gallons molasses, 0.5 lb. salt, 0.5 gallon P–300, and X77. |
| 36 | 2 gallons molasses, 0.5 gallon P–300, and X77. |
| 37 | 8 gallons molasses, 0.5 gallon P–300 and X77. |
| 38 | 8 gallons molasses, 0.5 lb. salt. |
| 39 | 2 gallons molasses, 0.5 lb. salt, 0.5 gallon P–300. |
| 40 | 4 gallons molasses, 0.5 gallon P–300 and X77. |
| 41 | 0.5 gallon P–300 and X77. |
| 42 | 4 gallons molasses, 0.5 gallon P–300 and X77. |
| 43 | 2 gallons molasses, 0.5 lb. salt, 0.5 gallon P–300. |
| 44 | Check containing 40 lbs. zinc. |
| 45 | Check. |
| 46 | 0.5 gallon P–300 and X77. |
| 47 | 2 gallons molasses, 0.5 gallon P–300 and X77. |
| 48 | 2 gallons molasses, 0.5 lb. salt, 0.5 gallon P–300, and X77. |
| 49 | 1 gallon molasses, 1 lb. salt, 1 gallon P–300, 1 qt. K262. |
| 50 | 1 gallon molasses, 0.5 lb. salt, 0.5 gallon P–300, X77, and 40 lbs. zinc. |
| 51 | 1 gallon molasses, 0.5 lb. salt, 0.5 gallon P–300, 1 qt. K262. |
| 52 | 2 gallons molasses, 0.5 lb. salt, 0.5 gallon P–300, 1 qt. K262. |
| 53 | 2 gallons molasses, 0.5 lb. salt, 0.5 gallon P–300 and 1 qt. K262. |
| 54 | 2 gallons molasses, 0.5 lb. salt, 0.5 gallon P–300 and 1 qt. K262. |
| 55 | Check. |
| 56 | 1 gallon molasses, 1 lb. salt, 1 gallon P–300 and 1 qt. K262. |
| 57 | 1 gallon molasses, 0.5 gallon P–300 and X77. |
| 58 | 2 gallons molasses, 0.5 lb. salt, 0.5 gallon P–300, and X77. |
| 59 | 2 gallons molasses, 0.5 lb. salt, 0.5 gallon P–300 and 1 qt. K262. |
| 60 | 2 gallons molasses, 0.5 lb. salt, 0.5 gallon P–300. |
| 61 | 1 gallon molasses, 0.5 lb. salt, 0.5 gallon P–300, X77 and 40 lbs. zinc. |
| 62 | 1 gallon molasses, 0.5 gal. P–300 and X77. |
| 63 | 1 gallon molasses, 0.5 gal. P–300 and X77. |
| 64 | 1 gallon molasses, 0.5 lb. salt, 0.5 gallon P–300 and X77. |
| 65 | 2 gallons molasses, 1 lb. salt, 0.5 gallon P–300 and 1 qt. K262. |
| 66 | 1 gallon molasses, 0.5 lb. salt, 0.5 gallon P–300, and 1 qt. K262. |
| 67 | 1 gallon molasses, 0.5 lb. salt, 1 gallon P–300 and 1 qt. K262. |
| 68 | Check. |
| 69 | 4 gallons molasses, 0.5 lb. salt, 0.5 gallon P–300 and X77. |
| 70 | 2 gallons molasses, 0.5 lb. salt, 0.5 gallon P–300 and X77. |
| 71 | 2 gallons molasses, 0.5 gallon P–300 and X77. |
| 72 | Check. |
| 73 | 2 gallons molasses, 1 lb. salt, 0.5 salt, 0.5 gallon P–300 and 1 qt. K262. |
| 74 | 2 gallons molasses, 0.5 lb. salt, 0.5 gallon P–300 and 1 qt. K262. |
| 75 | 1.5 gallons molasses, 1 lb. salt, 0.5 gallon P–300 and 1 qt. Tronic. |
| 76 | 1.5 gallon molasses, 1 lb. salt, 0.5 gallon P–300, and ⅜ gallon Tronic. |
| 77 | 2 gallons molasses, 1 lb. salt, ⅜ qt. P–300 and 1 qt. Tronic. |
| 78 | 2 gallons molasses, 1 lb. salt, 0.5 gallon P–300 and ⅜ gallon Tronic. |
| 79 | Check. |
| 80 | 2 gallons molasses, 1 lb. salt, 0.5 gallon P–300, 1 gallon K262. |
| 81 | 2 gallons molasses, 0.5 lb. salt, 0.5 gallon P–300, and 1 gallon K262. |

TABLE I.—Continued

Formula: Contents
- 82 ----- 2 gallons molasses, 0.5 lb. salt, 1 gallon P-300, 1 gallon K262.
- 83 ----- 2 gallons molasses, 0.5 lb. salt, 0.5 gallon P-300 and 2 qts. K262.
- 84 ----- 2 gallons molasses, 0.5 lb. salt, 0.5 gallon P-300 and 2 qts. K262.
- 85 ----- 2 gallons molasses, 0.5 lb. salt, 1 gallon P-300 and 2 qts. K262.
- 86 ----- 2 gallons molasses, 1 lb. salt, 0.5 gallon P-300 and 2 qts. K262.
- 87 ----- 2 gallons molasses, 0.5 lb. salt, 0.5 gallon P-300 and 1 qt. K262.

Of the base formulations, the presently preferred formula is Formula 52. It was the formula used in Examples 2-6 (diluted to 100 gallons as set forth above).

EXAMPLE 1

The procedure employed was as follows. Cuttings of sweet cherry were taken during the winter months when the trees were dormant. These cuttings were placed in containers of clean water and caused to bud out at which time by trial and error it was found that the best time to spray for maximum results was just as the buds were beginning to swell. The cuttings were sprayed with various formulations at dormancy and various degrees of swelling up to full bloom, check samples were left unsprayed. In runs 1-14, the cuttings were sprayed once when the buds started swelling (run 1 was the check). In runs 15 to 27, the cuttings were sprayed twice, first when the buds started swelling and second before they showed white (run 15 was the check). In runs 28-44, the cuttings were sprayed once when the buds started to swell (run 28 was the check). In runs 45-54, the cuttings were sprayed once when the buds were slightly swelled (run 45 was the check). In runs 55-67, the cuttings were sprayed dormant and warmed up quickly (run 55 was the check). In runs 68-71, the cuttings were sprayed twice, first when the buds were swelled and second just before blooming (run 68 was the check). In runs 72-78, the cuttings were sprayed once when the buds were swelling and warmed up fast (run 72 was the check). In runs 79-87, the cuttings were treated once after swelling and left in shed 48 hours (run 79 was the check).

After spraying with the frost control formulas each batch was bloomed out and samples of each subject to various temperatures from 10° F. to 28° F. for thirty-minute periods, and recorded on tags attached to each. These specimens were then placed at 75° F. for 2 hours and then tested by cutting and examining with a 10 power Bausch and Lomb glass.

Minor discolorations were considered dead. Green fruits were considered to be alive. All findings were recorded in chart form. The results were set forth in Table 2.

TABLE 2

Run (formula): Lowest temperature of protection (° F.)
- 1 -------- 24.
- Check
- 2 -------- 18.
- 3 -------- (Between 12 and 16.)
- 4 -------- (Between 16 and 20.)
- 5 -------- (Between 14 and 22.)
- 6 -------- 17.
- 7 -------- 17 (or below).
- 8 -------- 18.
- 9 -------- (Between 16 and 18.)
- 10 ------ (Between 15 and 19.)
- 11 ------ (Below 14.)
- 12 ------ 19.
- 13 ------ 21.
- 14 ------ 18.
- 15 ------ 25.
- Check
- 16 ------ (Between 18 and 20.)
- 17 ------ (Between 21 and 23.)
- 18 ------ 19 (Mostly dead, cutting apparently mostly dead).
- 19 ------ (Between 15 and 18.)
- 20 ------ (Between 12 and 19.)
- 21 ------ 20.
- 22 ------ 22.
- 23 ------ (Below 17.)
- 24 ------ (Higher than 19.)
- 25 ------ 18.
- 26 ------ 24.
- 27 ------ 24.
- 28 ------ 24 (Some dead at 27.)
- Check
- 29 ------ 22.
- 30 ------ (Between 16 and 21.)
- 31 ------ (Between 19 and 23.)
- 32 ------ 23 (Or higher).
- 33 ------ (Between 19 and 21.)
- 34 ------ 25.
- 35 ------ (Between 22 and 24.)
- 36 ------ (Between 13 and 16.)
- 37 ------ (Between 16 and 18.)
- 38 ------ (Between 20 and 22.)
- 39 ------ (Between 25 and 27.)
- 40 ------ (Higher than 23.)
- 41 ------ (Between 25 and 28.)
- 42 ------ (Between 17 and 21.)
- 43 ------ (Between 14 and 17.)
- 44 ------ (Between 19 and 21.)
- 45 ------ 23.
- Check
- 46 ------ (Between 22 and 24.)
- 47 ------ 22.
- 48 ------ 19.
- 49 ------ 20.
- 50 ------ 21.
- 51 ------ (Between 18 and 22.)
- 52 ------ 18.
- 53 ------ 11 (Or below.)
- 54 ------ 11 (Or below.)
- 55 ------ (Between 17 and 21.)
- Check
- 56 ------ 19.
- 57 ------ (Between 16 and 18.)
- 58 ------ 19.
- 59 ------ (Cuttings apparently mostly dead.)
- 60 ------ 22.
- 61 ------ 20.
- 62 ------ 19 (Some alive at 15.)
- 63 ------ 19.
- 64 ------ (Between 24 and 22.)
- 65 ------ 17.
- 66 ------ 22.
- 67 ------ —
- 68 ------ (Between 22 and 24.)
- Check
- 69 ------ (Above 20.)
- 70 ------ (Between 20 and 24.)
- 71 ------ 19.
- 72 ------ (Between 24 and 26.)
- Check
- 73 ------ (Between 20 and 22.)
- 74 ------ 19.
- 75 ------ (Between 24 and 27.)
- 76 ------ (Between 24 and 27.)
- 77 ------ (Between 21 and 24.)
- 78 ------ 24.
- 79 ------ 23.
- Check
- 80 ------ 27.
- 81 ------ (Between 22 and 24.)
- 82 ------ 24.
- 83 ------ (Between 18 and 20.)
- 84 ------ 24.

TABLE 2.—Continued

85 ------ (Between 16 and 22.)
86 ------ (Below 18.)
87 ------ (Below 19.)

In Examples 2–6, the spraying was carried out in the field. The trees were sprayed the first time with the frost control chemical as the buds were swelling. Cuttings containing fruit buds were taken of all varieties about a week after spraying. These were carefully tagged and then immediately subjected to various temperatures between 7° and 28° F. for 30 minutes and left for 2 hours at 75° F. Samples were then cut and examined for damage using the Bausch and Lomb 10 power glass. Each test was recorded under the proper variety and the stage of development was also noted as the season advanced. Check samples were also taken as a normal for comparison. The work was repeated every other day until the frost season was entirely past. Trees of each variety were also sprayed a second time just before bloom. (It was found that the second spray best follows the first by only a few days. On pears even a third spray a few days later is desirable.)

An average of nearly 10° F. protection was noted on deciduous fruits. As stated Formulation 52 appropriately diluted with water to provide 1 gallon of formulation in 100 gallons of water was used in Examples 2–6.

EXAMPLE 2

The trees were sprayed when the buds were swelling unless otherwise indicated under "Development of Fruit." The controls were damaged at around 27–28° F. The extra protection using the molasses formulation of the invention is noted in Table 3.

TABLE 3

| Tree | Extra protection with molasses (° F.) | Development of fruit |
|---|---|---|
| Bing cherry | 3 | |
| Do | 5 | |
| Apple (Delicious) | 8+ | |
| Pear | 8+ | |
| Apple (Delicious) | 9+ | |
| Pear | 11 | |
| Peach | 9+ | Petals falling. |
| Cherry | 4 | |
| Apple (Delicious) | 10+ | King pink. |
| Pear | 8+ | |
| Sweet cherry | 6 | Bloom. |
| Plum | 2 | Do. |
| Apple (Delicious) | 10 | All pink. |
| Pear | 15 | All white, some bloom. |
| Plum | 9 | Full bloom. |
| Apple (Delicious) | 11+ | All pink. |
| Pear | 14 | Near full bloom. |
| Sweet cherry | 8 | Petals falling. |
| Plum | 5 | |
| Peach | 6 | Do. |
| Apple (Rome) | 8+ | Some pink. |
| Apple (Jonathan) | 9– | All pink. |

EXAMPLE 3

The trees were sprayed at the indicated times. The treatment was as in Example 2. The results are set forth in Table 4.

TABLE 4

| Tree | Extra protection with molasses (° F.) | Development of fruit |
|---|---|---|
| Apple (Delicious) | 10 | Near bloom. |
| Sweet cherry | 9 | Petals falling. |
| Pear | 13 | Full bloom. |
| Plum | 3 | Do. |
| Apple (Jonathan) | 7 | Some bloom. |
| Apple (Rome) | 5 | All pink. |
| Peach | 10 | Petals off. |
| Apple (Delicious) | 12 | Some bloom. |
| Apple (Jonathan) | 9+ | Bloom. |
| Apple (Rome) | 7+ | Near bloom. |
| Pear | 12 | Petals falling. |
| Cherry | 13 | Do. |
| Plum | 3+ | Do. |
| Prune | 4+ | Full bloom. |
| Apple (Delicious) | 15 | Near full bloom. |
| Apple (Jonathan) | 9 | Full bloom. |
| Apple (Rome) | 12 | Near full bloom. |
| Pear | 17 | Petals off. |
| Cherry | 14 | Do. |
| Plum | 11 | Do. |
| Prune | 5 | Full bloom. |
| Peach | 9 | Small fruit. |

EXAMPLE 4

The procedure was the same as in Example 2 except that some of the trees were sprayed twice, a week apart. The results are set forth in Table 5.

TABLE 5

| Tree | Number of sprays | Extra protection with molasses (° F.) | Development of fruit |
|---|---|---|---|
| Apple (Delicious) | 1 | 14 | Full bloom. |
| Do | 2 | 13+ | Do. |
| Apple (Rome) | 1 | 11+ | ½ out bloom. |
| Do | 2 | 12 | Do. |
| Apple (Jonathan) | 1 | 9 | Full bloom. |
| Do | 2 | 8 | Do. |
| Pear | 1 | 18 | Petals off. |
| Plum | 1 | 13 | Petals loose. |
| Prune | 1 | 8 | Late bloom. |
| Peach | 2 | 14 | Small fruit. |
| Sweet cherry | 1 | 13 | Do. |
| Do | 2 | 13 | Do. |
| Apple (Delicious) | 1 | 10 | Full bloom. |
| Do | 2 | 12 | Do. |
| Apple (Rome) | 1 | 8 | Do. |
| Do | 2 | 10 | Do. |
| Apple (Jonathan) | 1 | 5 | Petals off. |
| Do | 2 | 6 | Do. |
| Pear | 1 | 14 | Small fruit (pea size). |
| Do | 2 | 13 | Do. |
| Plum | 1 | 13 | Petals off. |
| Do | 2 | 13 | Do. |
| Prune | 1 | 12 | Do. |
| Peach | 2 | 15 | Schucks tight. |
| Sweet cherry | 1 | 14 | Small fruit. |
| Do | 2 | 13 | Do. |
| Pear | 1 | ¹5 | Do. |
| Apple (Delicious) | 1 | 4 | Petals falling. |
| Do | 2 | 4 | Do. |
| Cherry | 1 | 4 | Cherry pea size. |
| Do | 2 | 4 | Do. |

¹ 45 min. cooling.

EXAMPLE 5

The procedure was the same as in Example 4. The results are shown in Table 6.

TABLE 6

| Tree | Number of sprays | Extra protection (° F.) | Development of fruit |
|---|---|---|---|
| Apple (Delicious) | 1 | 3 | Petals falling. |
| Do | 2 | 3 | Do. |
| Apple (Jonathan) | 1 | 2 | Do. |
| Do | 2 | 3+ | Do. |
| Sweet cherry | 1 | 10+ | Pea size fruit. |
| Do | 2 | 12 | Do. |
| Plum | 1 | 9 | Small fruit. |
| Do | 2 | 9+ | Do. |
| Prune | 1 | 7 | Petals off. |
| Peach | 2 | 11 | Shuck slipping. |
| Pear | 1 | 10+ | Small green. |
| Do | 2 | 10+ | Do. |
| Apple (Jonathan) | 1 | 6 | Small fruit. |
| Do | 2 | 8 | Do. |
| Apple (Rome) | 2 | 3 | Most petals off. |
| Sweet cherry | 1 | 7 | Small fruit. |
| Do | 2 | 4+ | Do. |
| Plum | 1 | 3 | Shucks tight. |
| Prune | 1 | 9 | Do. |
| Peach | 2 | 14 | Shucks off. |
| Pear | 1 | 14 | Small fruit. |
| Do | 2 | 13+ | Do. |
| Apple (Delicious) | 1 | 10 | Pea size. |
| Do | 2 | 8 | Do. |
| Apple (Jonathan) | 1 | 7 | Small pea size. |
| Do | 2 | 8 | |
| Apple (Rome) | 1 | 5 | Small match. |
| Do | 2 | 8 | Shuck. |
| Sweet cherry | 1 | 10 | Shuck off. |
| Plum | 2 | 7 | Pea size. |
| Peach | 2 | 7 | Large pea size. |
| Pear | 1 | 12 | Do. |
| Do | 2 | | |

EXAMPLE 6

The procedure was the same as in Example 4. The results are shown in Table 7.

TABLE 7

| Tree | Number of sprays | Extra protection (° F.) | Development of fruit |
|---|---|---|---|
| Apple (Delicious) | 1 | 12 | Large. |
| Do | 2 | 7+ | Do. |
| Apple (Jonathan) | 1 | 5 | Pea size fruit. |
| Do | 2 | 4+ | Do. |
| Apple (Rome) | 1 | 7 | Do. |
| Do | 2 | 8 | Do. |
| Sweet cherry | 1 | 10 | Small marble size. |
| Do | 2 | 9 | Do. |
| Plum | 1 | 13 | Do. |
| Peach | 2 | 11 | 2× pea size. |
| Pear | 1 | 7 | Do. |
| Do | 2 | 7 | Do. |
| Apple (Delicious) | 1 | 8 | ⅝″ size. |
| Do | 2 | 10 | Do. |
| Apple (Jonathan) | 1 | 10 | ½″ size. |
| Do | 2 | 10 | Do. |
| Apple (Rome) | 1 | 8 | ⅜ inch size. |
| Do | 2 | 8 | Do. |
| Sweet cherry | 1 | 7 | ½ inch size. |
| Do | 2 | 7 | Do. |
| Plum | 1 | 7 | 1½ inch size. |
| Do | 2 | 5 | Do. |
| Prune | 1 | 6 | ⅝ inch size. |
| Peach | 2 | 13+ | Do. |
| Pear | 1 | 13 | Do. |
| Do | 2 | 10 | ¾ inch diameter. |

What is claimed is:

1. The method of protecting living plants from frost damage which comprises applying to the plant aqueous sugar beet molasses containing 0.1 to 8 gallons of molasses in every 100 gallons.

2. The method according to claim 1 wherein the plants are deciduous fruit trees.

3. The method according to claim 2 wherein the molasses is applied to the fruit while the fruit is in a stage from the green bud stage to the fruitlet stage.

4. The method according to claim 3 wherein the molasses is applied together with a pollination assisting composition.

5. The method according to claim 4 wherein the pollination assisting composition comprises metal salts of hydroxyethyl ethylene diamine triacetate.

6. A method according to claim 5 wherein said salts contain sodium, manganous, and ferrous salts and there is also present carbamide.

7. A method according to claim 5 wherein the molasses and pollination assisting composition are applied together with a minor amount of sodium chloride.

8. A method according to claim 6 wherein the molasses and pollination assisting composition are applied together with an emulsifier and a hydrocarbon solvent.

9. A method according to claim 8 wherein the emulsifier includes an anionic sulfonate emulsifier and a nonionic alkylaryl polyether alcohol emulsifier.

10. A method according to claim 9 wherein there is also included a minor amount of sodium chloride in the molasses mixture.

11. A method according to claim 10 wherein the molasses is applied as an aqueous spray containing in every 100 gallons, 0.1 to 8 gallons of molasses, 0.06 to 0.5 pound of salt per gallon of molasses, 0.06 to 1 gallon of pollination assisting composition per gallon of molasses and 0.1 to 0.25 gallon of emulsifier per gallon of molasses.

12. A frost control composition comprising aqueous sugar beet molasses containing in every 100 gallons 0.1 to 8 gallons of molasses and metal salts of hydroxyethyl ethylene diamine triacetate in an amount of 0.06 to 1 gallon per gallon of molasses.

13. A composition according to claim 12 including an emulsifier.

14. A composition according to claim 12 wherein the molasses is used in an amount of 0.25 to 4 gallons per 100 gallons, the pollination assisting agent is used in an amount of 0.25 gallon per gallon of molasses and comprises sodium, ferrous and manganous salts of hydroxyethyl ethylene diamine triacetate, and carbamide.

15. A composition according to claim 14 including 0.1 to 0.25 gallon of emulsifier mixture per gallon of molasses, the emulsifier mixture including a hydrocarbon solvent, a sodium petroleum sulfonate and an alkylaryl polyether alcohol.

References Cited

UNITED STATES PATENTS

| | | | |
|---|---|---|---|
| 1,219,856 | 3/1917 | Parker | 131—144XV |
| 2,749,268 | 6/1956 | Newcomer | 424—361XV |
| 2,921,409 | 1/1960 | Seifter | 47—58 |
| 2,962,416 | 11/1960 | Taylor | 424—361XV |

OTHER REFERENCES

Biological Abstracts, vol. 30, May–August 1956, #17800, Sci. and Culture 20(8)–387 Bajpai, R.N.

ROBERT E. BAGWILL, Primary Examiner

U.S. Cl. X.R.

71—26, 97, 113, 118; 424—361